US007590730B2

(12) United States Patent
Chen et al.

(10) Patent No.: US 7,590,730 B2
(45) Date of Patent: Sep. 15, 2009

(54) METHOD FOR DETECTING STATUS OF HOST AND/OR I/O PERIPHERALS IN CENTRALIZED COMPUTER SYSTEM

(75) Inventors: Pi-Cheng Chen, Sinjhuang (TW); Chin Tsai Yen, Taipei (TW); Yuan-Tai Lin, Linkou Township, Taipei County (TW); Hsin Chih Lien, Taipei (TW)

(73) Assignee: Quanta Computer, Inc., Tao Yuan Shien (TW)

( * ) Notice: Subject to any disclaimer, the term of this patent is extended or adjusted under 35 U.S.C. 154(b) by 301 days.

(21) Appl. No.: 11/818,794

(22) Filed: Jun. 14, 2007

(65) Prior Publication Data

US 2008/0040423 A1 Feb. 14, 2008

(30) Foreign Application Priority Data

Sep. 8, 2006 (TW) ............................ 95133368 A

(51) Int. Cl.
*G06F 15/16* (2006.01)

(52) U.S. Cl. ...................................... 709/224; 709/203

(58) Field of Classification Search ......... 709/200–203, 709/217–227

See application file for complete search history.

(56) References Cited

U.S. PATENT DOCUMENTS

| | | | | |
|---|---|---|---|---|
| 6,374,295 | B2 * | 4/2002 | Farrow et al. | 709/223 |
| 6,654,891 | B1 * | 11/2003 | Borsato et al. | 726/6 |
| 7,000,016 | B1 * | 2/2006 | Vanderbeck et al. | 709/226 |
| 7,103,668 | B1 * | 9/2006 | Corley et al. | 709/231 |
| 2002/0010767 | A1 * | 1/2002 | Farrow et al. | 709/223 |
| 2002/0133573 | A1 * | 9/2002 | Matsuda et al. | 709/220 |
| 2003/0177236 | A1 * | 9/2003 | Goto et al. | 709/225 |
| 2006/0165056 | A1 * | 7/2006 | Komaki | 370/352 |
| 2006/0168196 | A1 * | 7/2006 | Herbert et al. | 709/224 |
| 2006/0168278 | A1 * | 7/2006 | Lazen et al. | 709/230 |

* cited by examiner

*Primary Examiner*—Moustafa M Meky
(74) *Attorney, Agent, or Firm*—Stites & Harbison, PLLC; Juan Carlos A. Marquez, Esq

(57) ABSTRACT

The invention discloses a centralized computer system, i.e., so-called blade PC system. The centralized computer system according to the invention includes a plurality of centralized and bladed hosts and a plurality of I/O peripherals. In particularly, the centralized computer system according to the invention is capable of automatically detecting a current status of each host and/or each set of I/O peripherals.

11 Claims, 2 Drawing Sheets

METHOD FOR DETECTING STATUS OF HOST AND/OR I/O PERIPHERALS IN CENTRALIZED COMPUTER SYSTEM

BACKGROUND OF THE INVENTION

1. Field of the invention

The invention relates to a centralized computer system, i.e., so called blade PC system, and, more particularly, to a centralized computer system capable of automatically detecting the current status of the hosts and/or the I/O peripherals by programming design.

2. Description of the prior art

Many commercial businesses and enterprises make extensive use of personal computers (PCs) in their daily operations. Typically, each user of a PC in the enterprise has a networked PC at his/her desk or work area. As the number of networked computer systems utilized in an enterprise increases, the management of resources in the network may become increasingly complex and expensive.

Figure 1:
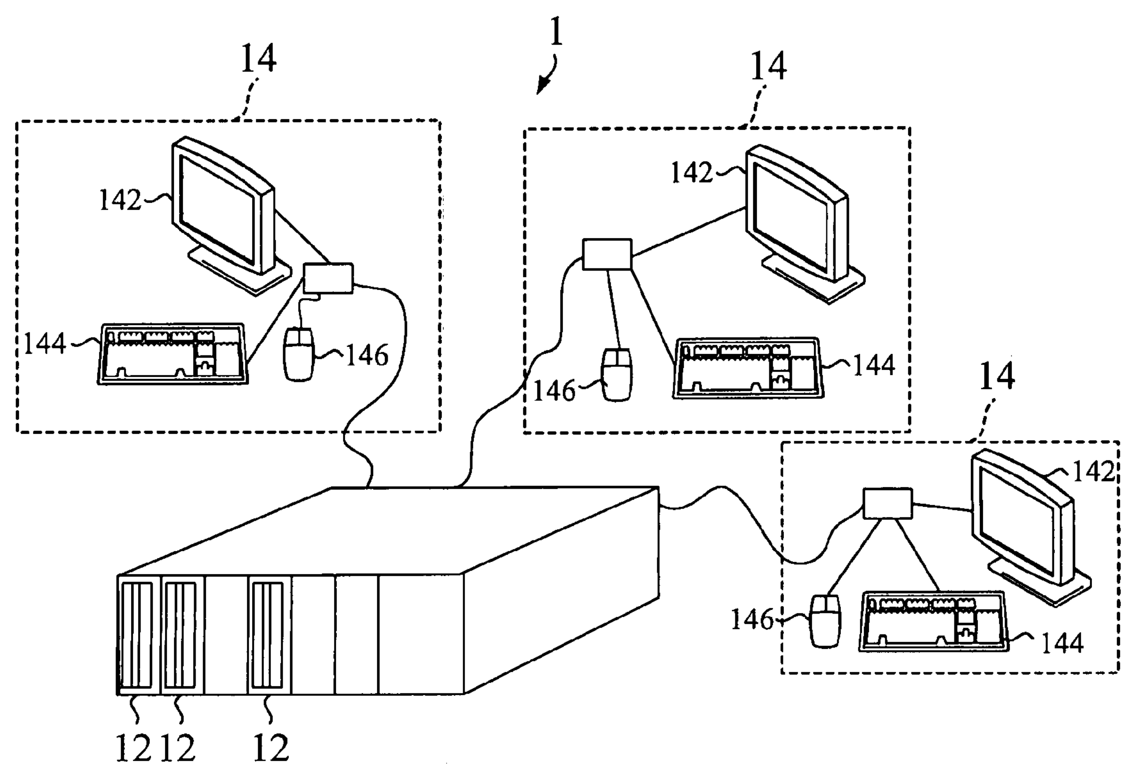

Referring to FIG. 1, FIG. 1 is a schematic diagram illustrating an infrastructure of a typical centralized computer system. To overcome the aforesaid problems of personal computers, the centralized computer system, i.e., so-called blade PC system, has been developed. As shown in FIG. 1, the centralized computer system 1 comprises a plurality of hosts 12, and each host 12 is equipped with and operated by a set of I/O peripherals 14. Each set of I/O peripherals 14 comprises at least one peripheral device. The hosts 12 in the centralized computer system are bladed, i.e., each host 12 is implemented into a "card". In other words, each host 12 comprised on a circuit card comprises standard computer system components. As shown in FIG. 1, each set of I/O peripherals 14 comprises a display 142, a keyboard 144, a mouse 146, and/or other peripheral devices for human interface. The centralized computer system 1 is capable of communicating with the I/O peripherals 14 by transmitting and receiving encoded I/O signals via the network. The I/O peripherals 14 correspond to the hosts 12.

In general, a large blade PCs (hosts) and I/O peripherals are required in enterprises. Relatively, the functions of management in these devices are much more complex and variable than those in general network devices, such as authentication, privilege, broadcast setting of video conference/video education, setting of voice over internet protocol (VoIP), installation of blade PC operating system, firmware updating of embedded system, and the like. Therefore, service manager not only has to search for all usable devices existing in the business network but also should be capable of detecting the current status of each device at any time, such as plug in-out, busy/idle, and the like. In the prior art, search tools can be classified as follows.

(1) Broadcast package: all devices in the net segment can receive the broadcast package from the service manager. However, this kind of package would be blocked by router and incapable of crossing over the net segment. The broadcast package is only suitable for a small network.

(2) Scanning: for the IP addresses in all net segments of the network, ping-pong scanning is performed regularly. This manner consumes more time, such that data cannot be transmitted in time and the server will suffer a heavy burden.

Therefore, the scope of the invention is to provide a centralized computer system and the status detecting method for automatically detecting the current status of the hosts and/or the I/O peripherals.

SUMMARY OF THE INVENTION

A scope of the invention is to provide a centralized computer system and the status detecting method for automatically detecting the current status of the hosts and/or the I/O peripherals by programming design.

According to a preferred embodiment, the status detecting method of the invention is applied in the centralized computer system. The centralized computer system comprises at least one host and a service manager. According to the status detecting method of the invention, first of all, the centralized computer system receives a request signal from the host and, in response to the request signal, transmits an offer package to the host, wherein the offer package comprises a domain name corresponding to the service manager. Afterward, according to the domain name of the service manager, the centralized computer system searches for an IP address corresponding to the service manager. Finally, according to the IP address of the service manager, the host transmits a notification package to the service manager every a predetermined time, wherein the notification package comprises a current status related to the host. Whereby, the centralized computer system of the invention is capable of automatically detecting the current status of the host and/or the I/O peripherals.

The advantage and spirit of the invention may be understood by the following recitations together with the appended drawings.

BRIEF DESCRIPTION OF THE APPENDED DRAWINGS

Figure 2:
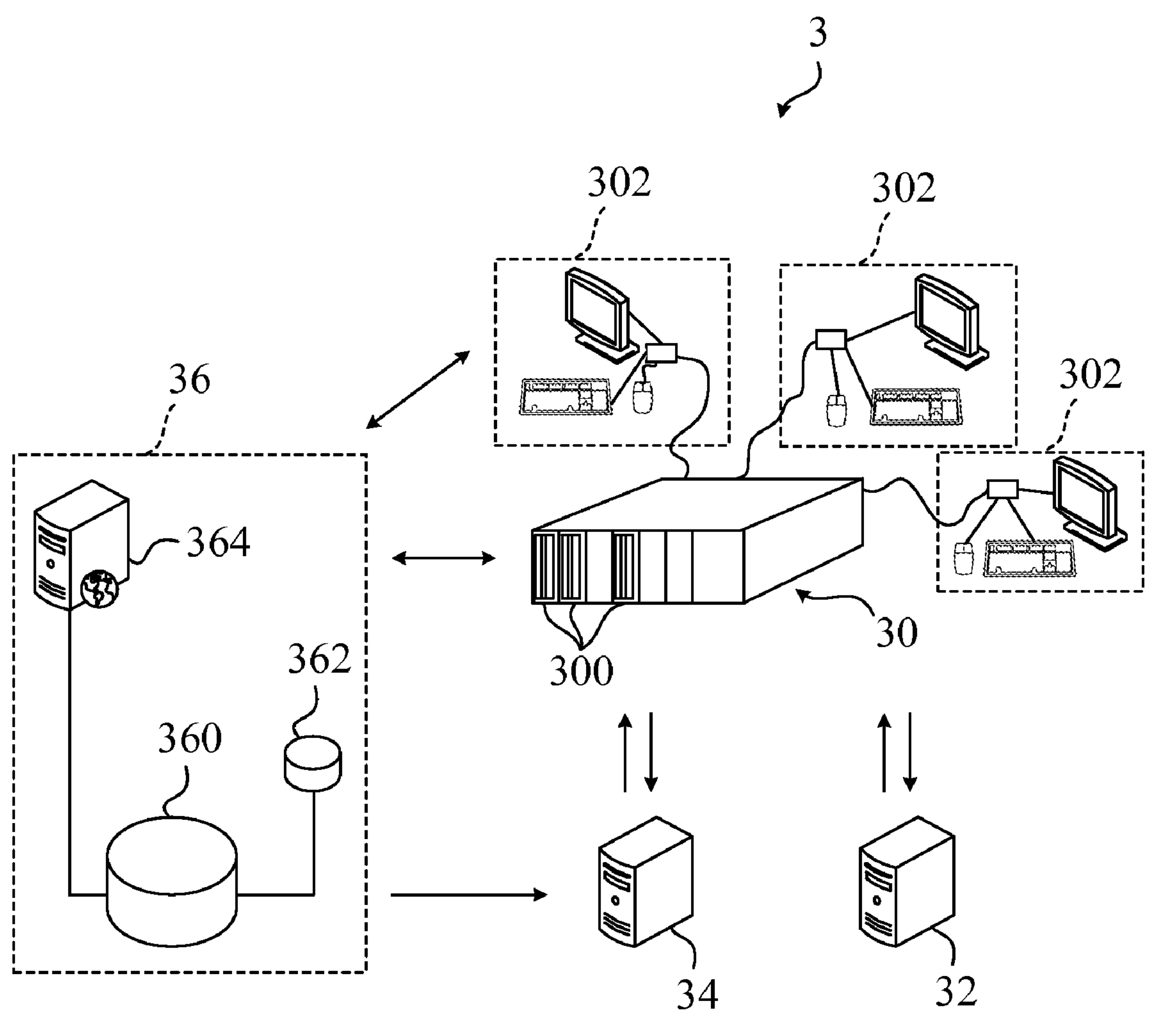

FIG. 1 is a schematic diagram illustrating an infrastructure of a typical centralized computer system; and FIG. 2 is a schematic diagram illustrating an infrastructure of a centralized computer system according to a preferred embodiment of the invention.

DETAILED DESCRIPTION OF THE INVENTION

Referring to FIG. 2, FIG. 2 is a schematic diagram illustrating an infrastructure of a centralized computer system 3 according to a preferred embodiment of the invention. The centralized computer system 3 comprises a chassis 30, a Dynamic Host Configuration Protocol (DHCP) server 32, a Domain Name System (DNS) server 34, and a service manager 36. The classis 30 is equipped with at least one host 300, i.e., so-called blade PC system. In this embodiment, the classis 30 is equipped with three hosts 300. Each of the hosts 300, the DHCP server 32, the DNS server 34, and the service manager 36 communicate with each other via the network.

In the centralized computer system 3, the DHCP server 32 is used for receiving a first request signal from each host 300 and, in response to the first request signal, for transmitting a first offer package to the corresponding host 300, wherein the first offer package comprises a domain name corresponding to the service manager 36. The DNS server 34 is used for providing an IP address corresponding to the service manager 36. After receiving the first offer package, according to the domain name of the service manager 36, the host 300 searches the DNS server 34 for the IP address of the service manager 36. Afterward, according to the IP address of the service manager 36, the host 300 transmits a first notification package to the service manager 36 every a first predetermined time, wherein the first notification package comprises a first current status related to the host 300.

It should be noted that the domain name of the service manager 36 is recorded in a vendor specific field of the DHCP server 32. For a general device, it would ignore the data recorded in the vendor specific field. In the invention, the host 300 is capable of reading the data from the vendor specific field by programming design, so as to search the DNS server 34.

In this embodiment, once the IP address corresponding to the service manager 36 changes, the service manager 36 will transmit a Dynamic Domain Name System (DDNS) package to the DNS server 34 to dynamically update the IP address corresponding to the service manager 36. Whereby, even if the IP address of the service manager 36 changes, the IP address corresponding to the domain name in the DNS server 34 is still correct.

As shown in FIG. 2, the centralized computer system 3 may further comprises three sets of I/O peripherals 302. Each set of I/O peripherals 302 corresponds to one of the three hosts 300 respectively. In this embodiment, the DHCP server 32 also receives a second request signal from each set of I/O peripherals 302 and, in response to the second request signal, transmits a second offer package to the set of I/O peripherals 302, wherein the second offer package also comprises the domain name corresponding to the service manager 36. After receiving the second offer package, according to the domain name of the service manager 36, the set of I/O peripherals 302 searches the DNS server 34 for the IP address of the service manager 36. Afterward, according to the EP address of the service manager 36, the set of I/O peripherals 302 transmits a second notification package to the service manager 36 every a second predetermined time, wherein the second notification package comprises a second current status related to the set of I/O peripherals 302.

In practical applications, the second predetermined time can be the same as/different from the first predetermined time.

As shown in FIG. 2, the service manager 36 may comprise a database 360, a cache memory 362, and a web server 364. In this embodiment, the database 360 is used for recording the status of each host 300 and each set of I/O peripherals 302. The cache memory 362 is used for buffering a first prior status of each host 300 and a second prior status of each set of I/O peripherals 302. When the first current status of the host 300 is different from the first prior status recorded in the cache memory 362, the service manager 36 will update the first prior status recorded in the database 360 by the first current status. Similarly, when the second current status of the set of I/O peripherals 302 is different from the second prior status recorded in the cache memory 362, the service manager 36 will update the second prior status recorded in the database 360 by the second current status. Additionally, the web server 364 can provide web service for allowing all users in different systems to read the data recorded in the database 360.

In this embodiment, the classis 30 of the centralized computer system 3 may be further equipped with a Modular Management Board (MMB) (not shown), whereby, each host 300 is capable of transmitting and/or receiving signals via the MMB. For example, the first notification package of each host 300 can be integrated into a single package by the MMB and then be transmitted to the service manager 36 to decrease the network flow.

Compared to the prior art, the centralized computer system of the invention is capable of automatically detecting the current status of the hosts and/or I/O peripherals by programming design and is capable of updating the current status every a predetermined time. Additionally, even if the IP address of the service manager changes, the IP address corresponding to the domain name in the DNS server will be updated in time. Further, one MMB is capable of transmitting the current status of all hosts in the classis at one time to decrease the network loading greatly.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A status detecting method for a centralized computer system, the centralized computer system comprising at lease one host and a service manager, the status detecting method comprising steps of:

receiving a first request signal from the at least one host;

in response to the first request signal, transmitting a first offer package to the host, the first offer package comprising a domain name corresponding to the service manager;

according to the domain name of the service manager, searching for an IP address corresponding to the service manager; and according to the IP address of the service manager, transmitting a first notification package from the host to the service manager every a first predetermined time, the first notification package comprising a first current status related to the host.

2. The status detecting method of claim 1, further comprising step of:

when the first current status of the host is different from a first prior status recorded in the service manager, updating the first prior status by the first current status.

3. The status detecting method of claim 1, further comprising step of:

when the IP address corresponding to the service manager changes, dynamically updating the IP address corresponding to the service manager.

4. The status detecting method of claim 1, wherein the centralized computer system further comprises at lease one set of I/O peripherals, the status detecting further comprising steps of:

receiving a second request signal from the at least one set of I/O peripherals;

in response to the second request signal, transmitting a second offer package to the set of I/O peripherals, the second offer package comprising the domain name corresponding to the service manager;

according to the domain name of the service manager, searching for the IP address corresponding to the service manager; and according to the IP address of the service manager, transmitting a second notification package from the set of I/O peripherals to the service manager every a second predetermined time, the second notification package comprising a second current status related to the set of I/O peripherals.

5. The status detecting method of claim 4, further comprising step of:

when the second current status of the set of I/O peripherals is different from a second prior status recorded in the service manager, updating the second prior status by the second current status.

6. A centralized computer system, comprising:

at least one host;

a service manager;

a Dynamic Host Configuration Protocol (DHCP) server for receiving a first request signal from the at least one host and, in response to the first request signal, transmitting a first offer package to the host, the first offer package comprising a domain name corresponding to the service manager; and a Domain Name System (DNS) server for providing an IP address corresponding to the service manager, the host searching the DNS server for the IP address of the service manager according to the domain name of the service manager, wherein according to the IP address of the server manager, the host transmits a first notification package to the service manager every a first predetermined time, the first notification package comprises a first current status related to the host.

7. The centralized computer system of claim 6, wherein when the first current status of the host is different from a first prior status recorded in the service manager, the server manager updates the first prior status by the first current status.

8. The centralized computer system of claim 6, wherein when the IP address corresponding to the service manager changes, the service manager transmits a dynamic DNS package to the DNS server to dynamically update the IP address corresponding to the service manager.

9. The centralized computer system of claim 6, further comprising at least one set of I/O peripherals, wherein:

the DHCP server receives a second request signal from the at least one set of I/O peripherals and, in response to the second request signal, transmits a second offer package to the set of I/O peripherals, the second offer package comprises the domain name corresponding to the service manager;

the set of I/O peripherals searches the DNS server for the IP address of the service manager according to the domain name of the service manager; and according to the IP address of the server manager, the set of I/O peripherals transmits a second notification package to the service manager every a second predetermined time, the second notification package comprises a second current status related to the set of I/O peripherals.

10. The centralized computer system of claim 9, wherein when the second current status of the set of I/O peripherals is different from a second prior status recorded in the service manager, the service manager updates the second prior status by the second current status.

11. The centralized computer system of claim 6, further comprising a modular management board, wherein the host transmits and/or receives signals via the modular management board.

* * * * *